April 23, 1968 ATSUSHI KIUCHI ETAL 3,379,220
HIGH BENDING STRENGTH TUBULAR MEMBERS OF FIBER
REINFORCED PLASTICS
Filed March 17, 1965
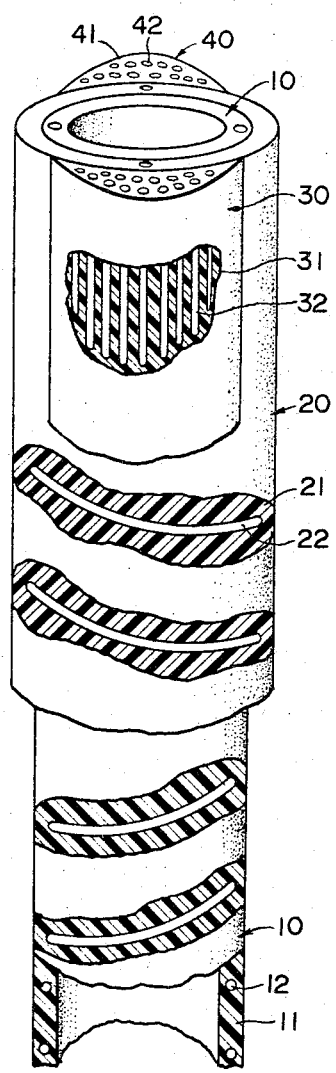

3,379,220
HIGH BENDING STRENGTH TUBULAR MEMBERS OF FIBER REINFORCED PLASTICS
Atsushi Kiuchi, 23-31 Fumioka-cho, Shizuoka, Hamamatsu, Japan; Sohei Suzuki, 12 Ebisucho 1-chome, Gifu, Japan; and Saburo Koike, 52 Nakakusuno-cho, Kagamihara, Inaba-gun, Japan
Filed Mar. 17, 1965, Ser. No. 440,394
Claims priority, application Japan, Mar. 21, 1964, 39/15,419
2 Claims. (Cl. 138—125)

ABSTRACT OF THE DISCLOSURE

A multilayer tubular member of fiber reinforced plastic material high in bending strength, comprising a plurality of plastic layers in the form of coaxial tubes each including a thermosetting plastic material and embedded therein at least one length of tow of plastic fibers helically wound, the particular ones of said plastic layers each having said length of tow of plastic fibers which is embedded therein wound helically in one direction and the adjacent plastic layers each having said length of tow of plastic fibers embedded wound helically in the other direction, so that the direction of helical winding of the tows of plastic fibers alternates in successive layers, and a pair of longitudinal ridge portions symmetrically disposed on the diametrically opposed portions of one of the outer and inner peripheral surfaces of the tubular member throughout the length and being of the same thermosetting plastic material and a plurality of lengths of tow of the same plastic fibers as in the layers longitudinally embedded in spaced parallel relationship in the ridge portions, the plurality of plastic layers and said pair of the longitudinal ridge portions being incorporated in a unitary structure.

---

This invention relates to multilayer tubular members of fiber reinforced plastic materials high in bending strength.

The conventional tubular members of fiber reinforced plastic materials have been generally low in bending strength. Upon bending such a tubular member, cracks were apt to be formed in the neutral plane thereof with respect to the bending due to the shearing stress applied thereto. Also the compressed side of the tubular member was apt to buckle while the tensioned side thereof was apt to break.

Accordingly, it is the principal object of the invention to eliminate the disadvantage as above mentioned.

It is another object of the invention to provide an improved multilayer tubular member of fiber reinforced plastic material having a high bending strength.

It is a special object of the invention to provide an improved rod for use in pole vaulting.

With the above cited objects in view, the invention resides in a multilayer tubular member of fiber reinforced plastic material high in bending strength, comprising a plurality of plastic layers in the form of coaxial tubes each including a thermosetting plastic material and embedded therein at least one length of tow of plastic fibers helically wound, the particular ones of said plastic layers each having embedded therein said or each length of tow of plastic fibers wound helically in one direction alternating with the remaining plastic layers each having embedded therein said or each length of tow of plastic fibers wound helically in the other direction, and a pair of longitudinal ridge portions symmetrically disposed on the diametrically opposed portions of one of the outer and inner peripheral surfaces of the tubular member throughout the length including the same thermosetting plastic material and a plurality of lengths of tow of the same plastic fibers as the layers, longitudinally embedded in spaced parallel relationship in the ridge portions, the plurality of plastic layers and said or each pair of the longitudinal ridge portions being incorporated into a unitary structure.

The invention will become more readily apparent from the following description taken in conjunction with the accompanying drawing in which the single figure is a fragmental perspective view, partly in longitudinal section of a multilayer tubular member constructed in accordance with the teachings of the invention with parts cut away for the purpose of clarifying the internal construction.

Referring now to the drawing, a multilayer tubular member of fiber reinforced plastic material according to the teachings of the invention comprises the innermost or first layer in the form of a hollow circularly cylinder generally designated by the reference numeral 10 and a second layer also in the form of a hollow circularly cylinder generally designated by the reference numeral 20. The first cylindrical layer 10 is composed of any suitable thermosetting plastic material 11 and two lengths of tow of any suitable plastic fibers 12 in the form of a double helix running in one direction in this case in the form of a right-hand double helix as viewed in the drawing, embedded in the plastic material 11.

The second layer 20 coaxial with the first layer 10 is integrally secured to the latter and is composed of the same plastic material 21 as the first layer and two lengths of a plastic fiber tow 22 which is the same as those in the first layer, in the form of a double helix running in the other direction or in the form of a left-hand double helix as viewed in the drawings.

If desired, a third layer identical in construction to the first layer 10 may lie upon the second layer and a fourth layer identical in construction to the second layer lie upon the third layer and so on with all the layers secured together.

While each of the plastic layers is shown as having two lengths of plastic fiber tow embedded therein it is to be understood that each layer may include only one length of plastic fiber tow helically wound, if desired.

Thus it will be appreciated that the multilayer tubular member of the invention can include any desired number of plastic-fiber layers arranged such that the particular ones of the layers each having at least one length of tow of plastic fibers, in the form of a helix running in one direction, embedded in the plastic layer alternate with the remaining plastic layers each having at least one length of the plastic fiber tow in the form of a helix running in the other direction embedded in the plastic layer.

As shown in the drawing, the multilayer tubular member comprising two layers 10 is provided with a pair of longitudinal ridge portions of segmental cross section 30 and 40 integrally secured in symmetrical relationship to the diametrically opposed portion of the outer surface. The ridge portion 30 or 40 is composed of a plastic material 31 or 41 identical with that for the layers 10 and 20 and a plurality lengths of tow of a plastic fiber 32 or 42 identical with those embedded in the layers and disposed longitudinally in spaced parallel relationship. The surface of each ridge portion merges smoothly into the outer peripheral surface of the outermost layer.

It is now assumed that an axial force is applied to the tubular member thus far described to bend the same. Under this assumed condition, the diametrically opposed portions of the tubular member on which the ridge portions are formed will exhibit a higher resistance to such axially bending force than the remaining portions. For this reason the tubular member tends to be bent in a plane perpendicular to the plane of the drawing whereby one of the ridge portions, for example, the ridge portion 30 is subject to a tension stress while the other ridge portion 40 subject to a compression stress. Those longitudinal portions of the tubular member disposed between the pair of ridge portions are located in or adjacent the neutral plane with respect to the bending and hence tend to have cracks formed axially of the tubular member. However, due to a multiplicity of the tows of plastic fibers helically wound in the layers 10 and 20 intersecting the neutral plane, the longitudinal portion just described is sufficiently strong to withstand the shearing force due to the axial bending resulting in the occurrence of a small member of cracks thereon. At the same time, the compressed and tensioned sides of the tubular member can very effectively withstand the compression and tension forces respectively for the reasons that the tows of plastic fibers are disposed longitudinally of the tubular member.

From the foregoing, it will be appreciated that the multilayer tubular member of the invention exhibits very effective resistances to various stresses due to a bending moment applied to the same. In addition, it is high in mechanical strength and can be produced at inexpensive costs and having a light weight.

While the invention has been described in conjunction with the preferred embodiments thereof it is to be understood that various changes and modifications may be resorted to wtihout departing from the spirit and scope of the invention. For example, more than two lengths of plastic fiber tow may be embedded in the form of a multiple helix running in one or the other direction in each of the plastic layers. Also each of the plastic layers may be of an oblate cylinder rather than of a circular cylinder. In the latter case, the pair of longitudinal ridge portions 30 and 40 may be preferably formed symmetrically with respect to the maximum diameter of the cross section of the tubular member on the outer peripheral surface. In addition, the pair of longitudinal ridge portions may be formed symmetrically on the inner peripheral surface of the tubular member with the satisfactory results.

What we claim is:

1. A multilayer tubular member of fiber reinforced plastic material high in bending strength, comprising a plurality of plastic layers in the form of coaxial tubes each including a thermosetting plastic material and embedded therein at least one length of tow of plastic fibers helically wound, the particular ones of said plastic layers each having said length of tow of plastic fibers which is embedded therein wound helically in one direction and the adjacent plastic layers each having embedded therein said length of tow of plastic fibers embedded wound helically in the other direction, so that the direction of helical winding of the tows of plastic fibers alternates in successive layers, and a pair of longitudinal ridge portions symmetrically disposed on the diametrically opposed portions of one of the outer and inner peripheral surfaces of the tubular member throughout the length and being of the same thermosetting plastic material and a plurality of lengths of tow of the same plastic fibers as in the layers longitudinally embedded in spaced parallel relationship in the ridge portions, the plurality of plastic layers and said pair of the longitudinal ridge portions being incorporated in a unitary structure.

2. A multilayer tubular member as claimed in claim 1, wherein the plurality of plastic layers are in the form of an oblate cylinder and the pair of ridge portions are disposed on the tubular member symmetrically with the respect to the maximum diameter of the cross section of the layers.

References Cited
UNITED STATES PATENTS

| 2,722,237 | 11/1955 | Rosel | 138—174 |
| 2,747,616 | 5/1956 | De Ganahl | 138—132 X |
| 3,007,497 | 11/1961 | Shobert | 138—153 X |
| 3,022,802 | 2/1962 | Lewis | 138—125 |

FOREIGN PATENTS 323,095  8/1957  Switzerland.

LAVERNE D. GEIGER, *Primary Examiner.*

B. KILE, T. L. MOORHEAD, *Assistant Examiners.*